United States Patent
Severien et al.

(10) Patent No.: US 6,507,134 B1
(45) Date of Patent: Jan. 14, 2003

(54) ELECTRIC MOTOR

(75) Inventors: Herbert Severien, Schwalbach (DE); Michael Brack, Speyer (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/618,422

(22) Filed: Jul. 18, 2000

(30) Foreign Application Priority Data

Jul. 20, 1999 (DE) .......................................... 199 34 000

(51) Int. Cl.⁷ ................................................. H02K 7/08
(52) U.S. Cl. ........................................... 310/90; 310/90
(58) Field of Search .............................. 310/90, 66, 91, 310/89; 384/91, 129, 192, 202, 203, 204, 208, 517–518, 496, 456, 558, 563, 906, 215, 218; 29/596–598

(56) References Cited

U.S. PATENT DOCUMENTS 4,295,268 A * 10/1981 Punshon et al. ............. 310/683
5,794,867 A * 8/1998 Hermanns et al. ............. 310/89
5,899,574 A * 5/1999 Chujo ........................ 384/518
6,107,717 A * 8/2000 Lin et al. ...................... 310/90

FOREIGN PATENT DOCUMENTS

DE 2503574 8/1976

* cited by examiner

Primary Examiner—Tran Nguyen
(74) Attorney, Agent, or Firm—Martin A. Farber

(57) ABSTRACT

In an electric motor having a rotor which is arranged in a rotationally fixed manner on a shaft (4), a fixed bearing (7) is prestressed axially against a stop (9) by a spring element (11) in order to bear the shaft (4). The spring element (11) has an annular shape and has a larger external diameter than the fixed bearing (7). A rim (13), which is produced by peening, of the bearing plate (5) engages behind the external circumference of the element (11).

11 Claims, 1 Drawing Sheet

ELECTRIC MOTOR

FIELD AND BACKGROUND OF THE INVENTION

The invention relates to an electric motor having a stator, having a rotor which is arranged in a rotationally fixed manner on a shaft, having two bearing plates which each have a bearing for the shaft and with one of the bearings being in the form of a fixed bearing which holds the shaft axially and radially and the other bearing being in the form of a loose bearing which bears the shaft exclusively radially, and having a stop, which is arranged in the bearing plate, in order to support the fixed bearing in its intended axial position.

Particularly in modern motor vehicles, such electric motors are often used as a drive means for moving components and are known from practice. The electric motor fixed bearing often has a push fit on the shaft of the rotor. The bearing plate has a hole to hold the fixed bearing. The fixed bearing has a clearance fit in the hole. The fixed bearing is generally peened in the hole in order to secure it in its intended axial position in the bearing plate. However, this results in a risk of the fixed bearing being distorted and thus having a particularly short life.

Attempts have already been made to arrange a washer between the peening and the fixed bearing. However, this leads to bedding-in joints being formed, which allow the fixed bearing to become loose during operation of the electric motor. In consequence, the fixed bearing is no longer reliably held in its intended axial position and, after further operation of the electric motor, can enlarge the hole in the bearing plate. The shaft then has a large amount of radial play in the electric motor. This likewise leads to the electric motor having a particularly short life.

SUMMARY OF THE INVENTION

The invention is based on the problem of refining an electric motor of the type mentioned initially such that it has a particularly long life.

This problem is solved according to the invention in that the fixed bearing is prestressed elastically against the stop.

This refinement largely avoids the risk of the fixed bearing being distorted during assembly of the electric motor. Furthermore, bedding-in joints with the fixed bearing are kept at a particularly low level by means of the elastic prestressing, so that this reliably avoids the fixed bearing coming loose in the hole. The fixed bearing can therefore no longer enlarge the hole in the bearing plate. The electric motor according to the invention thus has a particularly long life.

According to one advantageous development of the invention, the prestressing of the fixed bearing against the stop is achieved particularly easily in terms of design if the side of the fixed bearing which faces away from the stop rests against a spring element.

According to another advantageous development of the invention, the spring element has particularly small dimensions if the spring element has an annular shape.

The electric motor according to the invention is particularly cost-effective if the spring element has a larger external diameter than the bearing and is held in its radially outer region in the bearing plate. This refinement allows the spring element to be designed like a spring disk.

The manufacturing costs of the electric motor according to the invention can be further reduced if the bearing plate has a recess which is arranged concentrically with respect to a hole for holding the fixed bearing and has a larger diameter than the hole, and if one edge of the bearing plate engages behind the spring element, in the recess on its side opposite the fixed bearing. Since only a particularly short spring movement is necessary for prestressing of the fixed bearing, the spring element may, in the simplest case, be a commercially available washer made of steel and having an external diameter of appropriate size.

BRIEF DESCRIPTION OF THE DRAWING

The invention allows numerous embodiments. In order to explain its basic principle further, one of these will be described in the following text and is illustrated in the figures of the drawing, in which.

DETAILED DESCRIPTION OF THE PREFERRED EMBODIMENT

Figure 1:
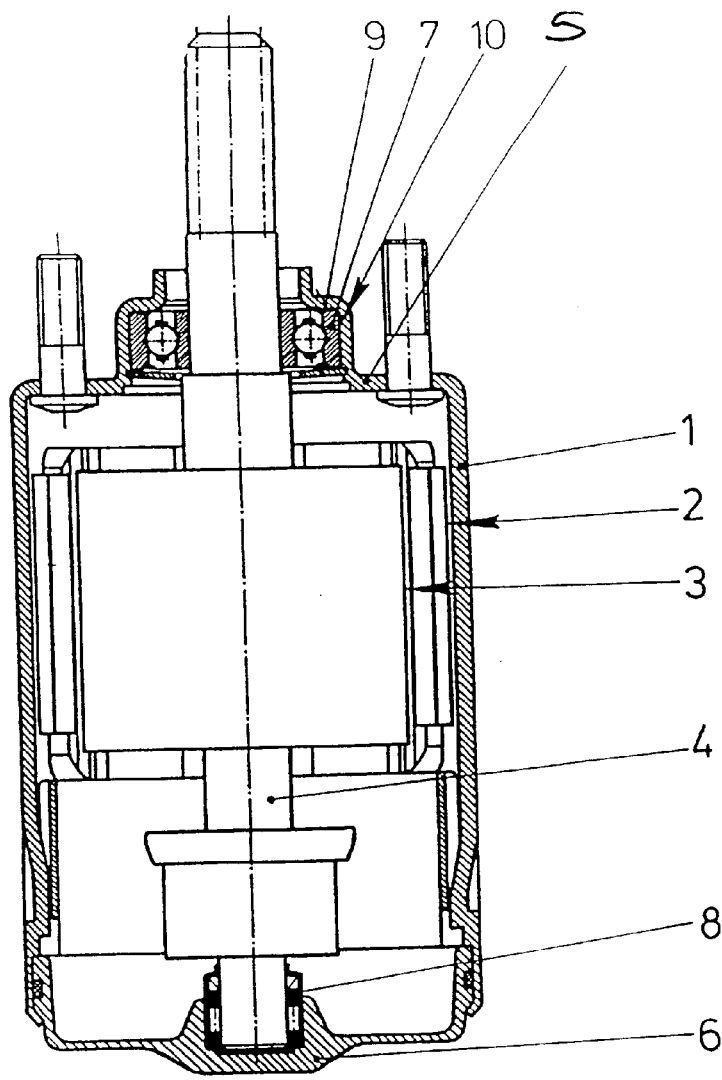
FIG. 1 shows a longitudinal section through an electric motor according to the invention.

FIG. 1 shows an electric motor having a stator 2 which is arranged in a fixed position in a tubular housing 1, and having a rotor 3 which is mounted in a rotationally fixed manner inside the stator 2. The rotor 2 is mounted on a shaft 4. The housing 1 has a bearing plate 5, 6 on each of its end faces. One of the bearing plates 5 has a fixed bearing 7 which holds the shaft 4 in the axial and radial directions. The second bearing plate 6 has a loose bearing 8 which holds the shaft 4 exclusively radially. The bearing plate 5 which holds the fixed bearing 7 has a hole 10, which is bounded by a stop 9, for holding the fixed bearing 7. The fixed bearing 7 has a clearance fit in the hole 10 and a push fit on the shaft 4.

Figure 2:
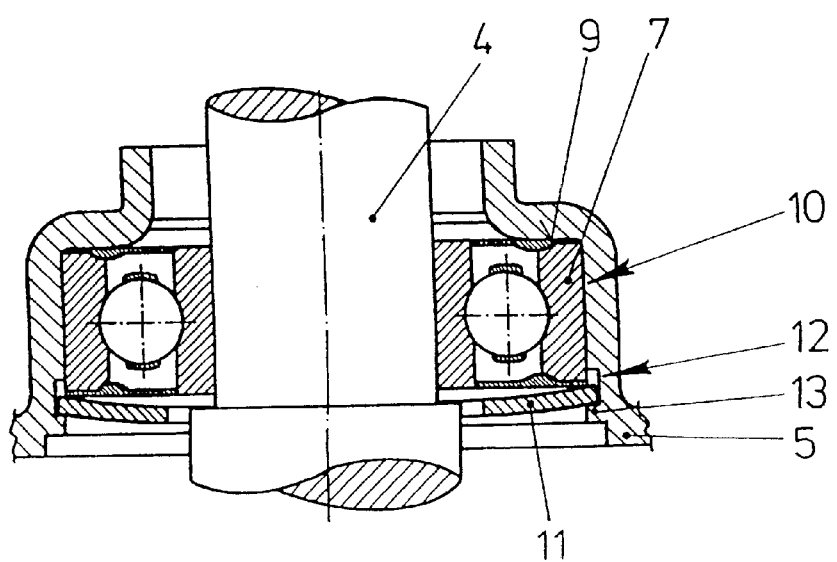
FIG. 2 shows a highly enlarged illustration of a fixed bearing of the invention and shown in FIG. 1.

FIG. 2 uses a highly enlarged illustration of the electric motor in the region of the fixed bearing 7 from FIG. 1 to show that the fixed bearing 7 is prestressed against the stop 9 by means of a spring element 11. A recess 12 having a larger diameter than the hole 10 is arranged in the bearing plate 5, on the side of the hole 10 facing away from the stop 9, in order to hold the radially outer region of the spring element 11. On the side opposite the fixed bearing 7, the spring element 11 is secured axially by a circumferential rim 13. This rim 13 was produced, for example, by peening the bearing plate 5. The rim 13 prestresses the radially outer region of the spring element 11 in the direction of the stop 9 for the fixed bearing 7. Since the spring element 11 requires only a particularly short spring movement, it may be in the form of a washer manufactured from sheet steel.

The spring element 11 has a larger external diameter than the fixed bearing 7. The spring element has a concave shape. The stop 9 comprises a separate member from said bearing plate 5 for the fixed bearing and has a bulge projecting axially downwardly and pressingly engaging a radially inner edge of a radially outer race of the fixed bearing, and at a top of the stop 9 the stop engages the bearing plate 5 for the fixed bearing. The stop 9 has a flat top pressed against the bearing plate 5 for the fixed bearing 7.

We claim:
1. An electric motor comprising
   a stator,
   a rotor arranged in a rotationally fixed manner on a shaft,
   two bearing plates each having a bearing for the shaft and one of the bearings being in form of a fixed bearing holding the shaft axially and radially and the other bearing being in form of a movable bearing for bearing the shaft exclusively radially, and a stop arranged in one of the bearing plates, to support the fixed bearing in a predetermined axial position, wherein the fixed bearing is prestressed elastically against the stop by a spring element engaging the fixed bearing, wherein the spring element has a larger external diameter than the fixed bearing and is held in a radially outer region of the spring element in said one bearing plate.

2. The electric motor as claimed in claim 1, wherein said spring element (11) has an annular shape.

3. An electric motor comprising a stator, a rotor arranged in a rotationally fixed manner on a shaft, two bearing plates each having a bearing for the shaft and one of the bearings being in form of a fixed bearing holding the shaft axially and radially and the other bearing being in form of a movable bearing for bearing the shaft exclusively radially, and a stop arranged in one of the bearing plates, to support the fixed bearing in a predetermined axial position, wherein the fixed bearing (7) is prestressed elastically against the stop (9), wherein a side of the fixed bearing (7) opposite from said stop (9) rests against a spring element (11), wherein the spring element (11) has a larger external diameter than the fixed bearing (7) and is held in a radially outer region of the spring element (11) in the bearing plate (5).

4. The electric motor according to claim 3, wherein said spring element has a central opening of a larger diameter than said shaft and has a concave shape.

5. An electric motor comprising a stator, a rotor arranged in a rotationally fixed manner on a shaft, two bearing plates each having a bearing for the shaft and one of the bearings being in form of a fixed bearing holding the shaft axially and radially and the other bearing being in form of a movable bearing for bearing the shaft exclusively radially, and a stop arranged in one of the bearing plates, to support the fixed bearing in a predetermined axial position, wherein the fixed bearing (7) is prestressed elastically against the stop (9), wherein a side of the fixed bearing (7) opposite from said stop (9) rests against a spring element (11), wherein the bearing plate (5) has a recess (12) arranged concentrically with respect to a hole (10) for holding the fixed bearing (7) and has a larger diameter than the hole (10), and wherein one edge (13) of the bearing plate (5) engages behind the spring element (11), in the recess (12) on a side opposite the fixed bearing (7).

6. An electric motor comprising a stator, a rotor arranged in a rotationally fixed manner on a shaft, two bearing plates each having a bearing for the shaft and one of the bearings being in form of a fixed bearing holding the shaft axially and radially and the other bearing being in form of a movable bearing for bearing the shaft exclusively radially, and a stop arranged in one of the bearing plates, to support the fixed bearing in a predetermined axial position, wherein the fixed bearing (7) is prestressed elastically against the stop (9), wherein a side of the fixed bearing (7) opposite from said stop (9) rests against a spring element (11), wherein said spring element (11) has an annular shape, wherein the spring element is a washer made of steel and has a larger external diameter than the fixed bearing.

7. The electric motor according to claim 6, wherein the stop has a flat top pressed against said bearing plate for the fixed bearing.

8. An electric motor comprising a stator, a rotor arranged in a rotationally fixed manner on a shaft, two bearing plates each having a bearing for the shaft and one of the bearings being in form of a fixed bearing holding the shaft axially and radially and the other bearing being in form of a movable bearing for bearing the shaft exclusively radially, and a stop arranged in one of the bearing plates, to support the fixed bearing in a predetermined axial position, wherein the fixed bearing (7) is prestressed elastically against the stop (9), wherein said bearing plate for the fixed bearing has a hole in which said fixed bearing is disposed, said hole being bounded at a top thereof by the stop, the stop comprising a separate member from said bearing plate for the fixed bearing and having a bulge projecting axially downwardly and pressingly engaging a radially inner edge of a radially outer race of the fixed bearing, and at a top of said stop said stop engages said bearing plate for the fixed bearing.

9. The electric motor as claimed in claim 8, wherein a spring element (11) engages adjacent a side of the fixed bearing (7) opposite from said stop (9) at the radially outer race of said fixed bearing.

10. An electric motor comprising a stator, a rotor arranged in a rotationally fixed manner on a shaft, two bearing plates each having a bearing for the shaft and one of the bearings being in form of a fixed bearing holding the shaft axially and radially and the other bearing being in form of a movable bearing for bearing the shaft exclusively radially, and a stop arranged in one of the bearing plates, to support the fixed bearing in a predetermined axial position, wherein the fixed bearing (7) is prestressed elastically against the stop (9), wherein a side of the fixed bearing (7) opposite from said stop (9) rests against a spring element (11), wherein a radially outer side of said spring element engages said bearing plate for the fixed bearing and adjacent said fixed bearing without engaging said shaft.

11. The electric motor according to claim 10, said spring element has a central opening of a larger diameter than said shaft and has a concave shape.

\* \* \* \* \*